(12) United States Patent
Brewitz et al.

(10) Patent No.: US 6,863,853 B2
(45) Date of Patent: Mar. 8, 2005

(54) MEANS AND METHOD OF MANUFACTURING A CARRIER OF INFORMATION OR DECORATION

(75) Inventors: Hans Brewitz, Kristianstad (SE); Lars Persson, Degeberga (SE); Thomas Svensson, Kristianstad (SE)

(73) Assignee: Nolato AB, Kristianstad (SE)

( * ) Notice: Subject to any disclaimer, the term of this patent is extended or adjusted under 35 U.S.C. 154(b) by 165 days.

(21) Appl. No.: 10/239,781

(22) PCT Filed: Apr. 5, 2001

(86) PCT No.: PCT/SE01/00744

§ 371 (c)(1),
(2), (4) Date: Dec. 27, 2002

(87) PCT Pub. No.: WO01/76847

PCT Pub. Date: Oct. 18, 2001

(65) Prior Publication Data

US 2003/0107153 A1 Jun. 12, 2003

(30) Foreign Application Priority Data

Apr. 5, 2000 (SE) ............................................. 0001290

(51) Int. Cl.[7] .......................... B29C 45/06; B29C 45/16
(52) U.S. Cl. ....................... 264/132; 264/255; 264/279; 264/297.3; 425/102; 425/129.1
(58) Field of Search .......................... 264/132, 135–137, 264/254, 255, 279, 297.2, 297.3, 328.8; 425/95, 102, 127, 129.1

(56) References Cited

U.S. PATENT DOCUMENTS

| | | | | |
|---|---|---|---|---|
| 2,811,744 A | * | 11/1957 | Baldanza |
| 3,743,458 A | * | 7/1973 | Hallauer et al. |
| 4,422,995 A | * | 12/1983 | Schad |
| 4,459,256 A | * | 7/1984 | Ziegler |
| 4,931,248 A | * | 6/1990 | Willemin |
| 5,474,134 A | * | 12/1995 | Spotzl |
| 6,264,869 B1 | * | 7/2001 | Notarpietro et al. |
| 6,623,677 B1 | * | 9/2003 | Smith et al. |

FOREIGN PATENT DOCUMENTS

| | | |
|---|---|---|
| EP | 0953419 | 11/1999 |
| JP | 59-182781 | * 10/1984 |
| JP | 63135214 | 10/1988 |
| JP | 8025413 | 5/1996 |
| JP | 8108449 | 8/1996 |

* cited by examiner

*Primary Examiner*—Jill L. Heitbrink
(74) *Attorney, Agent, or Firm*—Burns, Doane, Swecker & Mathis, LLP

(57) ABSTRACT

An assembly for manufacturing carriers of information or decoration, characterised by a mould unit comprising two mould means which are joinable with each other. The mould unit comprises an injection moulding station for injection moulding of said carriers, and a printing station with a stamping unit for applying to said carrier a covering formed in accordance with the current information or decoration. The present invention also concerns a corresponding method.

39 Claims, 3 Drawing Sheets

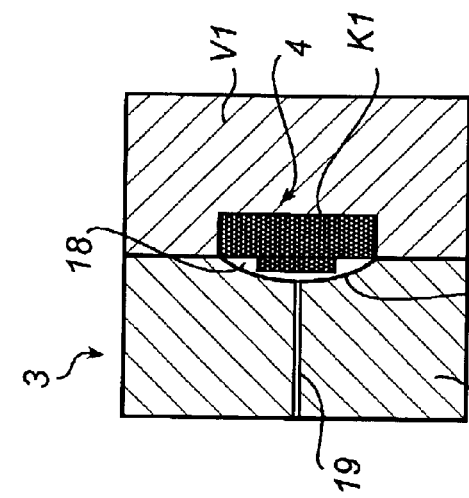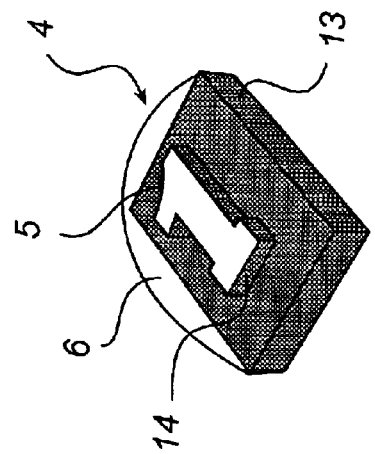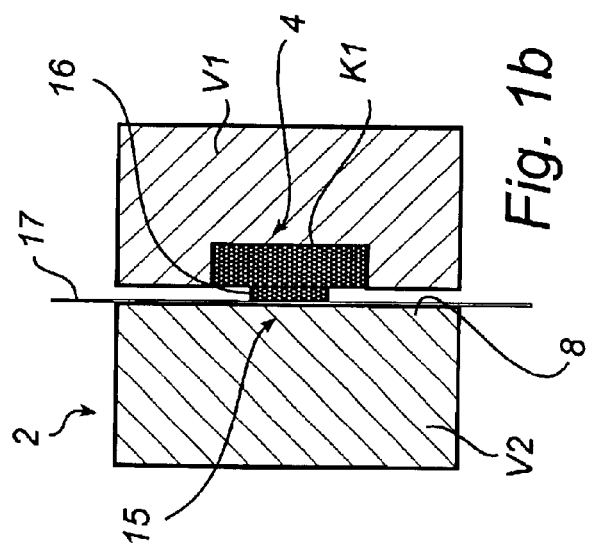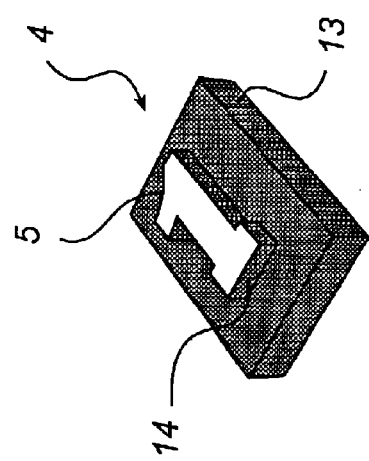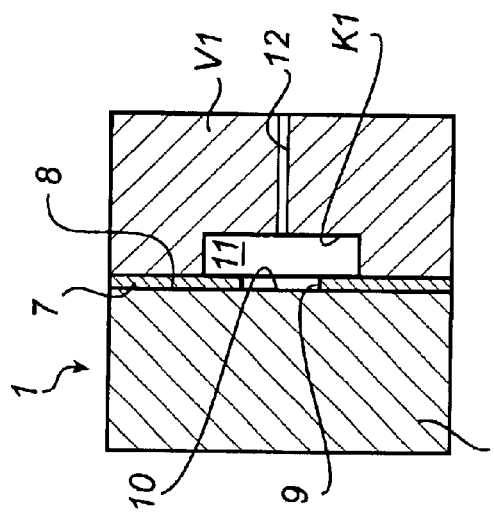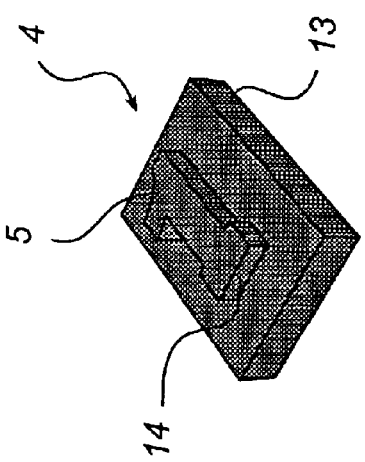

US 6,863,853 B2

MEANS AND METHOD OF MANUFACTURING A CARRIER OF INFORMATION OR DECORATION

FIELD OF THE INVENTION

The present invention relates to a means or assembly and a method for manufacturing carriers of information or decoration. More specifically, the invention relates to such an assembly and such a method for manufacturing said carriers by injection moulding of a polymer material.

BACKGROUND ART

There are many different fields of application for carriers of the type described by way of introduction. For instance, these carriers may constitute the keypad of a telephone, each carrier carrying information in the form of e.g. a figure. A carrier can also consist of an icon provided with a decoration. Such an icon can, for example, be applied to a product for displaying its trademark.

For manufacturing carriers of the above type, it is common to apply a prefabricated print from a strip with the desired information or decoration to the carrier. It is then most important for the strip to be positioned correctly in relation to each carrier for the print to be correctly positioned on the carrier.

According to another method, said carriers are manufactured from a metal foil of e.g. aluminium. Each carrier is punched from the foil and is given such a design that the carrier comprises a base and a portion projecting from the base. This portion carries a surface facing away from the base, the geometric appearance of the surface corresponding to the current information or decoration. Then each carrier is coated with a paint. The paint applied to the surface of the carrier is then ground off so as to expose the underlying metal structure. As a result, the information or decoration is clearly seen. Finally, a drop of, for example, acrylic is applied to the carrier so that the projecting portion and the surface carried thereby are encompassed by the drop. The drop is formed by surface tension. Appropriate subsequent treatment makes the drop solidify. The completed carrier thus carries the current information or decoration in a most aesthetically pleasing manner. However, this method suffers from drawbacks. The large number of operations imply that the production cost will be high. It is also difficult to obtain a sufficiently high quality level, which causes a high rejection level. Of course, this results in increased production costs.

JP6 3135214 discloses manufacturing of decorations by arranging a loose decoration on a cast body, after which the cast body and the decoration applied thereto are coated by a transparent top coat. The entire system is based on a central mould unit which is turnable between four fixed stations. The stations consist of casting a carrier, decorating the carrier, coating the decorated carrier and finally ejecting the completed carrier. At each station, separate moulds are made to engage the central mould unit. The technique involves many movable components, which leads to a complicated process which increases the production cost.

There is thus a need for a method for manufacturing carriers of information or decoration, which method allows simple and cost-efficient manufacture of said carriers.

SUMMARY OF THE INVENTION

The object of the present invention is to provide an improved assembly and an improved method for manufacturing carriers of information or decoration. The assemblies and the method should allow rational manufacture of said carriers at a relatively low cost.

According to the invention, the object is achieved by means of an assembly having the features defined in claims 1 and 18 and a method having the features defined in claims 15 and 37. Preferred embodiments of the assembly are evident from claims 2–14 and 19–36, and preferred embodiments of the method are evident from claims 16–17 and 38–40.

More specifically, an assembly for manufacturing carriers of information or decoration is provided, said assembly being characterised by a mould unit comprising two mould means which are joinable with each other, the mould unit comprising an injection moulding station for injection moulding of said carrier, and a printing station with a stamping unit for applying to said carrier a covering formed in accordance with the current information or decoration, the printing station being integrated into the injection moulding station.

As a result, an assembly is provided, which allows rational manufacture of said carriers at a low cost.

At the injection moulding station, carriers are manufactured and given the desired design.

At the printing station, a covering is applied to the carrier by means of the stamping unit. In practice, the paint or the like is simply applied to the carrier, the stamping unit ensuring that the covering will have a design according to the desired information or decoration, which consequently is clearly seen. There is no need for accurate positioning of the carrier.

By the printing station being integrated into the injection moulding station, the application of said covering is thus effected in connection with the injection moulding of the carrier, which means that the problem with the positioning of the carrier is completely eliminated.

The inventive assembly advantageously comprises a coating station for casting a coating of a transparent material over the covering applied to the carrier, a first of the mould means being rotatably arranged to allow displacement of a carrier provided with a covering at the printing station and retained in said first mould means, to the coating station. This allows rational manufacture of carriers, where information or decoration which appears by application of a covering will appear in a distinct and aesthetically pleasing manner while said information or decoration is protected by the coating.

The stamping unit of the printing station preferably comprises a stamping means, which is engageable with an embossed sheet for applying said covering to each carrier. This means that the application of covering is easily effected. The stamping means is only engaged with the embossed sheet for applying the covering to the carrier. The embossed sheet is preferably feedable to expose a not previously used sheet portion for each carrier.

The injection moulding station of the inventive assembly is advantageously adapted to manufacture carriers having a base and at least one portion which projects from the base and whose end facing away from the base has a surface of a geometric appearance corresponding to said information or decoration, the stamping unit being adapted to apply said covering to said surface. The projecting portion of each carrier advantageously acts as a stamping means of the stamping unit. As a result, the need for accurate positioning of the carrier relative to the stamping unit is completely eliminated. Of course, the reason for this is that the projecting portion, which thus acts as a stamping means, in itself defines the surface that is to be provided with a covering.

Said projecting portion thus carries a surface, whose geometric appearance corresponds to said information or decoration. If the information is a figure, for example a one, the surface is given the shape of the figure in question. By the carriers being made by injection moulding, rational production of a large number of carriers is allowed at a relatively low cost.

For manufacturing of carriers with a projection portion, the injection moulding station advantageously comprises a void formed in a first of the mould means and being open towards a second of the mould means, and an element arranged on the second mould means and having a through hole, the second mould means forming a bottom of the hole which is open towards the first mould means, said element being located, when putting together the mould means, so as to be arranged above the void to form a cavity defined by the void, the hole and the bottom, the void defining said base, the hole defining said projecting portion and the bottom defining said surface in connection with filling of the cavity for injection moulding of each carrier. This results in an inventive assembly comprising an injection moulding station which is extremely versatile and also relatively cheap. By exchanging the elements of the injection moulding station, it is possible to manufacture carriers of the same shape but carrying information or decoration of different designs. Moreover the elements are considerably easier and less expensive to manufacture compared with forming of corresponding holes in the second mould means. Apart from the fact that a thus designed mould means will be more expensive, only manufacture of carriers having one type of information or decoration is allowed, and therefore an injection moulding station having such a second mould means will be less versatile.

Said elements may comprise a plurality of holes to allow manufacture of carriers with a corresponding number of projecting portions and associated surfaces.

The printing station can also advantageously comprise an embossed sheet, said surface of each carrier being engaged with the embossed sheet in connection with the injection moulding of the carrier. Thus, the application of the covering to the surface of each carrier will be effected in a most simple manner. Owing to each surface being arranged on the projecting portion of the carrier, the surface need only be directed towards the embossed sheet and then be engaged with the same. There is no risk that a covering is applied to any other part than the surface of the carrier. There is also no need for positioning the carrier relative to the embossed sheet. This is of course due to the fact that the position of the information or decoration on the actual carrier is determined by the surface carried by the projecting portion of the carrier. At the printing station, it is only ensured that this information or decoration appears clearly by applying a covering to the surface.

Said embossed sheet is preferably feedable to expose a previously non-used sheet portion before application of said covering to the surface of each carrier. This ensures satisfactory application of a covering to each surface.

The embossed sheet can be arranged along the side of the second mould means facing the first mould means, between the second mould means and the element supported thereby, said surface of each carrier being engageable with the embossed sheet in connection with injection moulding of the carrier. This allows injection moulding of a carrier and application of a covering to the surface carried by the projecting portion in one step.

If the assembly is intended for manufacture of carriers with a projecting portion, the mould unit may also comprise a coating station for casting a coating of a transparent material over the projecting portion of the carrier. Thus, it is possible to manufacture, in a rational manner and at a low cost, carriers of an extremely aesthetically pleasing appearance where the information or decoration will have a three-dimensional depth.

Preferably the coating station comprises a holding means arranged on the first mould means and adapted to retain a carrier with its projecting portion facing the second mould means and a void formed in the second mould means and open towards the first mould means, said mould means, when being put together, forming a cavity defined by the carrier and the void, into which cavity the transparent material is introducible for casting a coating over said projecting portion and the associated surface. The holding means advantageous consists of a void identical to the void of the injection moulding station, the void of the coating station being movable to the injection moulding station by rotation of the first mould means about an axis of rotation, and the coating station comprising means for ejecting a completed carrier retained in its void.

The first mould means is advantageously intended for rotation through 180°, whereby the void of the injection moulding station is movable to the coating station during said rotation.

Moreover, according to the present invention, a method is provided for manufacturing a carrier of information or decoration, comprising the steps of injection moulding said carrier in a mould unit, and applying a covering to said carrier in the same mould unit by means of a stamping unit, the step of applying said covering to the surface being carried out integrally with the step of injection moulding the carrier. This results in a method which allows rational manufacture of carriers of information or decoration at a low cost. Conventional problems associated with positioning of a print relative to the carrier, complicated production steps and an insufficient quality level are eliminated, or in any case significantly reduced.

Preferably, each carrier is injection moulded so as to have a base and a portion projecting from the base and carrying at its end facing away from the base a surface, said covering being applied to said surface.

Preferably, the method also comprises the step of casting a transparent polymer material over the projecting portion and the associated surface. This results in an extremely aesthetically attractive carrier which exhibits information or decoration that is resistant to wear.

Furthermore, an assembly for manufacturing carriers of information or decoration is provided, said assembly being characterised by a mould unit comprising two mould means which are joinable with each other, the mould unit comprising an injection moulding station for injection moulding of said carrier, and a printing station with a stamping unit for applying to said carrier a covering formed in accordance with the current information or decoration, the stamping unit of the printing station comprising a stamping means, which is engageable with an embossed sheet for applying said covering to each carrier. It advantageous to use an embossed sheet since this can be continuously fed so that the stamping means in each cycle abuts against an unaffected portion of the embossed sheet. This ensures a homogeneous print of the decoration or information. Moreover a neat print with sharp and smooth edges is obtained.

According to a second preferred embodiment of the assembly, the printing station is arranged separately from the injection moulding station, a first of the mould means being rotatably arranged to allow displacement of a carrier manufactured at the injection moulding station and retained in said first mould means, to the printing station. However, the printing station can also be arranged separately from the injection moulding station and advantageously comprises an embossed sheet, said surface of each carrier being engaged with said embossed sheet in connection with the putting together of the mould means. The printing station advantageously comprises a holding means arranged on the first mould means and adapted to retain a carrier with is projecting portion facing the second mould means, the surface of the carrier being engageable with said embossed sheet by putting together the mould means. The holding means advantageously consists of a void identical to the void of the injection moulding station, a carrier manufactured at the injection moulding station and retained in its void being movable to the printing station by rotation of the first mould means about an axis of rotation.

If the mould unit also comprises a printing station arranged separately from the injection moulding station, the first mould means is advantageously intended for rotation through 120°, whereby, during said rotation, a carrier manufactured at the injection moulding station and retained in its void is movable to the printing station, a carrier provided with a covering at the printing station and retained in its void is movable to the coating station and the void positioned at the coating station is movable to the injection moulding station during ejection of a coated carrier retained in the same void.

Other embodiments of the assembly described above are evident from the dependent claims 19–36.

Finally, a method is also provided for manufacturing a carrier of information or decoration, comprising the steps of injection moulding said carrier in a mould unit, and engaging a stamping means included in a stamping unit of the mould unit with an embossed sheet for applying a covering to said carrier.

Further preferred embodiments of the method are evident from the dependent claims 38–40.

The present invention will now be described by way of example and with reference to the accompanying drawings.

BRIEF DESCRIPTION OF THE DRAWINGS

FIG. 1a is a schematically sectional view of an injection moulding station of the present invention.

FIG. 1b is a schematically sectional view of a printing station of the present invention.

FIG. 1c is a schematically sectional view of a coating station of the present invention.

FIG. 2a is a schematic perspective view of a carrier manufactured at the injection moulding station in FIG. 1a.

FIG. 2b is a schematic perspective view of a carrier treated at the printing station in FIG. 1b.

FIG. 2c is a schematic perspective view of a carrier treated at the coating station in FIG. 1c.

FIG. 3b shows a carrier manufactured in the assembly according to FIG. 3a.

FIG. 4b shows a carrier manufactured in the assembly according FIG. 4a.

DESCRIPTION OF EMBODIMENTS

Figure 3A:
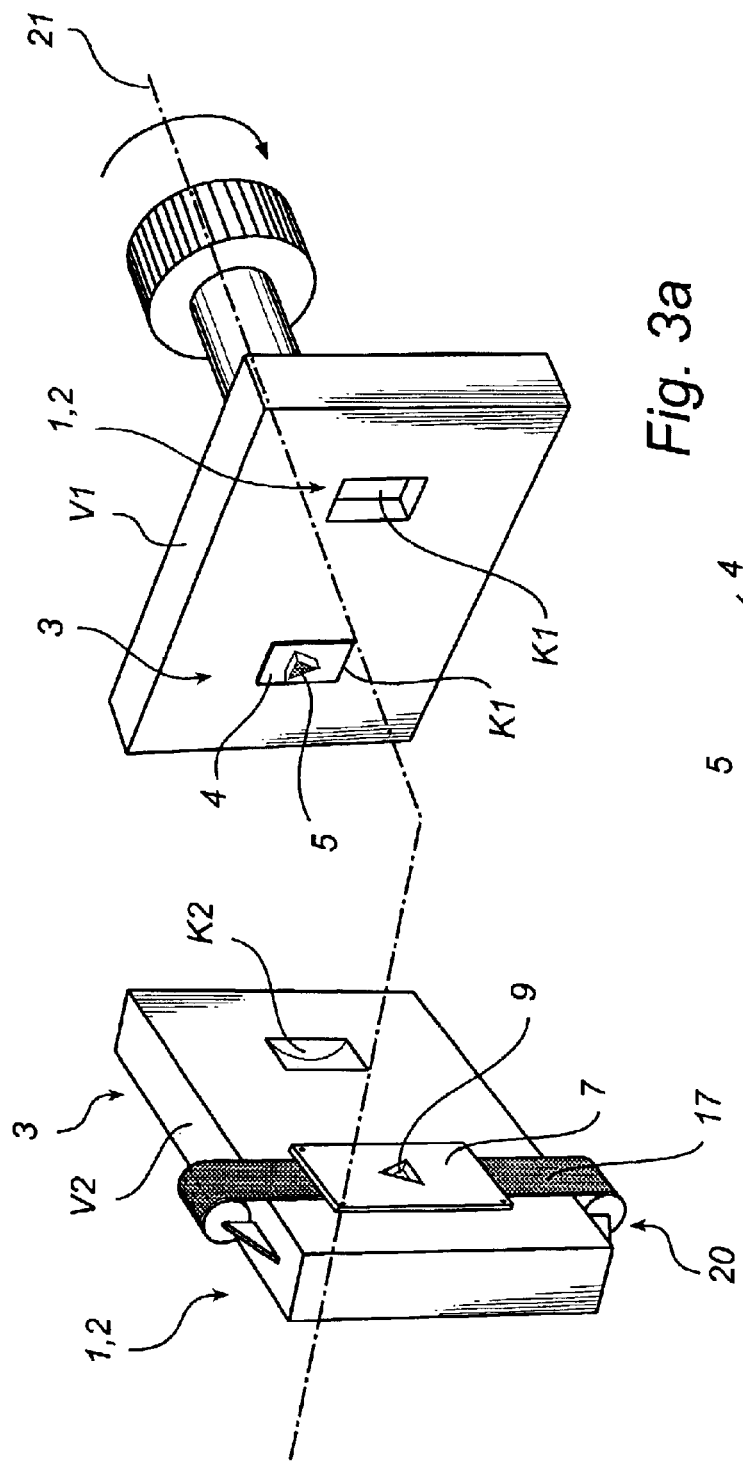
FIG. 3a is a schematic perspective view of an assembly according to a first embodiment of the present invention.

FIGS. 1a–b and 2a–c, to which reference is now made, illustrate three stations 1, 2 and 3 included in a preferred embodiment of the inventive assembly and a carrier 4 of information after treatment at each of the stations 1, 2 and 3.

FIG. 1a shows an injection moulding station 1 for manufacturing injection-moulded carriers 4, FIG. 1b shows a printing station 2 for applying a covering to a surface 5 of each carrier 4, and FIG. 1c shows a coating station 3 for casting a coating 6 of a transparent polymer material over the surface 5 of each carrier 4.

The injection moulding station 1 comprises a mould unit with two mould means V1, V2 which are joinable with each other. A void K1 is formed in the first mould means V1, said void K1 being open towards the second mould means V2. An element 7 is arranged on the side 8 of the second mould means V2 facing the first mould means V1. A through hole 9 is formed in the element 7 and the second mould means V2 forms a bottom 10 of said hole 9.

When putting together the mould means V1, V2, the element 7 is positioned so as to be arranged over the void K1 in the first mould means V1, for forming a closed cavity 11 which is defined by said void K1, said hole 9 and said bottom 10. Finally, a duct 12 leading to the void K1 is formed in the first mould means V1.

When injection moulding a carrier 4, a viscous polymer material is introduced with the aid of an injection moulding means (not shown) into the void K1 through the duct 12. The polymer material will fill the cavity 11, i.e. the polymer material will fill the void K1 and will also penetrate into the hole 9 and fill the same The carrier 4 illustrated in FIG. 2a is manufactured at said injection moulding station 1. The carrier 4 comprises a base 13 and a portion 14 projecting from the base 13. The portion 14 is formed more particularly in that part of the cavity 11 which is defined by the hole 9 of the element 7. The projecting portion 14 carries a surface 5 of a shape corresponding to predetermined information or decoration. In the example shown in FIG. 2a said surface 5 is formed as the figure one. It will be appreciated that the element 7 may comprise several holes if the information or decoration in question requires several surfaces as is the case of e.g. the figure eleven.

It will also be appreciated that said hole can be formed direct in the second mould means, thereby making it possible to omit the element. However, it is preferred for the hole to be through-going and formed in an element arranged on the second mould means. This results in an injection moulding station 1 which can be easily be adjusted for manufacturing carriers of other information or decoration. By using several elements with suitably formed holes it is possible to manufacture, for example, a numbered keypad for a telephone at one and the same injection moulding station.

Moreover, the cost for manufacturing a through hole in an element is considerably lower than the corresponding cost for manufacturing a non-through hole direct in the side of the second mould means facing the first mould means.

The use of the element 7 arranged on the second mould means V2 thus results in easier adjustment of the injection moulding station 1 and also in the cost for manufacturing the actual injection moulding station 1 being lower.

The printing station 2 shown in FIG. 1b is arranged in a mould unit comprising two mould means V1 and V2 which are joinable with each other. The carrier 4 is arranged with its surface 5 facing the second mould means V2 in a holding means of the first mould means V1. The holding means is in the shown embodiment a void K1 formed in the first mould means V1. The printing station 2 comprises a stamping unit 15 with a stamping means 16 and an embossed sheet 17 which is arranged along the side 8 of the second mould means V2 facing the first mould means V1. The sheet 17 is supported by a feeding means (not shown), which allows feeding for exposing a not previously used portion of the sheet 17 before applying a covering to the surface 5 of the carrier 4. In the shown example, the stamping means 16 consists of the portion 14 projecting from the base 13 of the carrier 4 and its associated surface 5. When putting together the mould means V1, V2, more specifically the carrier 4 arranged in the void K1 of the first mould means V1 will be engaged with the second mould means V2. The surface 5 of the carrier 4 will be engaged with the embossed sheet 17, whereby a covering is transferred from the sheet 17 to the surface 5. When the mould means V1, V2 are moved apart, the carrier 4 will thus have a surface 5 provided with a covering. The desired information or decoration will then appear clearly on the carrier 4.

The carrier 4 shown in FIG. 2b has been treated at the printing station 2 according to FIG. 1b. As is evident from the Figure, a covering has been applied to the surface 5 carried by the projecting portion 14. This makes the information, in the shown case a one, carried by the carrier 4 appear distinctly.

In some applications, it is possible to use the carrier 4 shown in FIG. 2b without further treatment. Carriers 4 formed in this way can be manufactured rationally at a low cost while each carrier 4 will obtain an aesthetically pleasing appearance.

However, it is preferred for the carrier shown in FIG. 2b to be treated further at the coating station 3 according to FIG. 1c. The coating station 3 comprises a mould unit with two joinable mould means V1 and V2.

A void K2 open towards the first mould means V1 is formed in the second mould means V2. The first mould means V1 comprises a holding means for retaining a carrier 4 with its surface 5 facing the second mould means V2. In the embodiment shown, said holding means consists of a void K1. When putting together the mould means V1, V2, a cavity 18 defined by the void K2 in the second mould means V2 and the carrier 4 is formed. By introducing with the aid of an injection moulding means (not shown) a viscous, transparent polymer material into said cavity 18 through a duct 19 formed in the second mould means V2, a coating 6 covering the projecting portion 14 of the carrier 4 and its associated surface 5 will be obtained by casting.

The carrier 4 shown in FIG. 2c is treated at the coating station 3. The information, i.e. the one, supported by the carrier 4 is coated by casting to obtain a coating 6 of a transparent material. The coating 4 thus obtains an extremely aesthetically pleasing appearance. The coating 6 also prevents the covering applied to the surface 5 from being worn off, thereby ensuring a sufficiently long service life of the carrier 4.

The stations 1, 2, 3 of the assembly have been described above separately. The stations 1, 2, 3 are according to the present invention, however, arranged in a common mould unit.

FIG. 3a shows a first preferred embodiment of the inventive assembly where the three different stations 1, 2, 3 described above are arranged in one and the same mould unit.

Components whose structure is equivalent to that described with reference to FIGS. 1a–c have been given the same reference numerals.

The printing station 2 is more specifically integrated into the injection moulding station 1. The embossed sheet 17 is arranged between the element 7 and the second mould means V2, which means that a sheet portion will be arranged at the bottom 10 of the hole 9. A feeding means 20 comprises two rolls, between which the sheet 17 is extended. By operating the feeding means 20, feeding of a new sheet portion will be allowed before application of a covering to the surface 5 of a carrier 4.

In order to manufacture a carrier 4, the mould means V1, V2 are put together, after which a viscous polymer material is introduced into the cavity 11 formed at the injection moulding station 1. The application of the covering to the surface 5 carried by the projecting portion 14 of the carrier 4 thus takes place in connection with the viscous polymer material filling the space defined by the hole 9. The embossed sheet 17 is arranged for embossing by heating, whereby said covering is applied to said surface 5 when this in its hot state is made to engage the sheet 17.

When the carrier 4 is injection moulded and its surface is provided with said covering, the mould means V1, V2 are moved apart, after which the first mould means V1 is rotated through 180° in the direction of the arrow about the axis of rotation 21. The void K1 and the carrier 4 arranged therein are supplied to the coating station 3. A second void K1 identical to the first void K1 is formed in the first mould means V1, said second void K1 being supplied to the injection moulding station 1 during said rotation. Repeated putting together of the mould means V2 allows injection moulding of a second carrier 4 while coating by casting for producing a coating 6 of the first carrier 4 takes place at the coating station 3. Of course, it will be ensured that a new sheet portion is fed to allow application of a covering to the surface 5 of the second carrier 4.

Subsequently the mould means V1, V2 are moved apart and the cycle can be repeated. The mould unit comprises means (not shown) for ejecting the carrier 4 completed at the coating station 3.

Figure 3B:
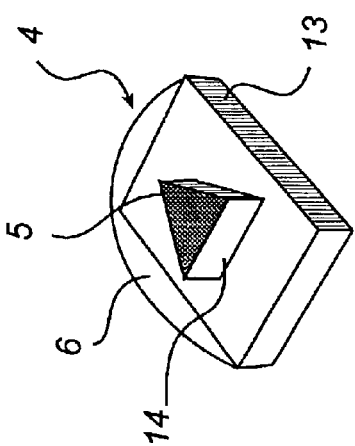

FIG. 3b shows a carrier 4 manufactured in the assembly according to FIG. 3a. The carrier 4 supports in the shown case a decoration in the form of an arrow.

Figure 4A:
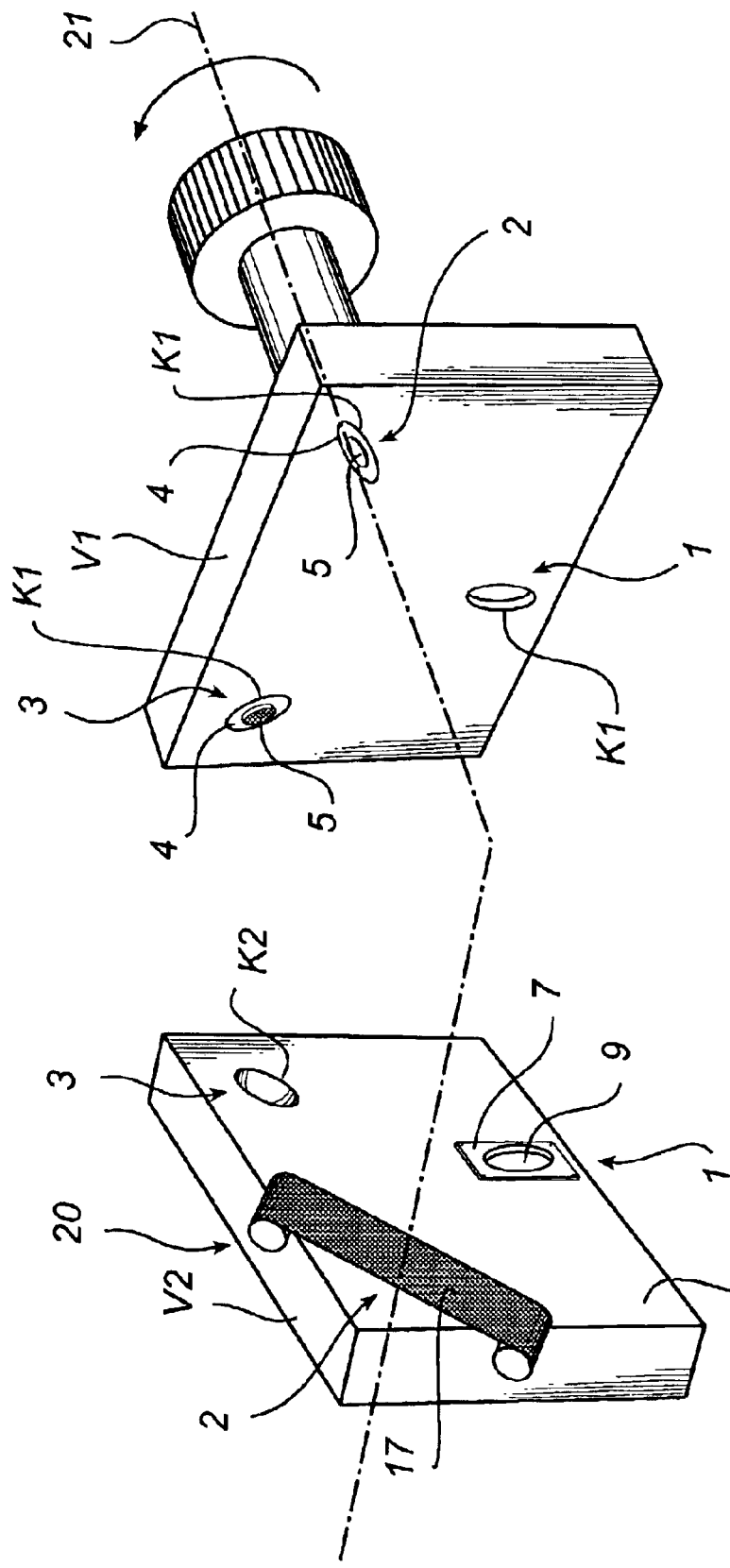
FIG. 4a is a schematic perspective view of an assembly according to a second embodiment of the present invention.

FIG. 4a shows a second preferred embodiment of the inventive assembly, in which all stations 1, 2, 3 are arranged in one and the same mould unit.

Once more, structurally equivalent components have been given the same reference numerals as in FIGS. 1a–c.

The second embodiment of the assembly essentially differs from the first embodiment of the assembly shown in FIG. 3a by the printing station 2 being arranged separately from the injection moulding unit 1.

The first mould means V1 is arranged for rotation through 120° in the direction of the arrow about the axis of rotation 21, whereby a carrier 4 injection moulded at the injection moulding station 1, during said rotation, is supplied to the printing station 2. At the same time, a carrier 4 treated at the printing station 2 is supplied to the coating station 3. Finally, the rotation also means that the void K1 positioned at the coating station 3 is supplied to the injection moulding station 1. Means (not shown) are arranged for ejection of a carrier 4 completed at the coating station 3 before or during said rotation. The process can then be repeated at each of the stations, after which the mould means is once more rotated through 120°.

Figure 4B:
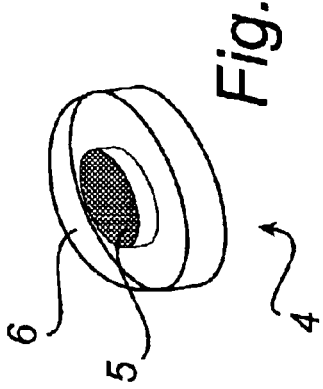

FIG. 4b illustrates a carrier 4 manufactured in the assembly according to FIG. 4a. In the shown case, the carrier 4 carries a decoration in the form of a circle.

Thus, the inventive assembly and the inventive method allow rational manufacture of carriers of information or decoration at a low production cost. All problems related to positioning of said information or decoration relative to the carrier are eliminated. Moreover, the method comprises a small number of production steps, which are all easy to control and check. This ensures a high quality level and a low rejection level.

It will be appreciated that the inventive assembly can be used for manufacturing differently designed carriers of different types of information or decoration. For instance, the carrier may constitute the coating of an electronic product, such as a telephone, in which case the decoration may consist of a trademark. It is thus conceivable for the carrier to have a significantly greater extent than the actual projection portion and the coating enclosing the same.

Consequently, the invention is not restricted to the shown embodiments, and several modifications and variations are conceivable. The invention is thus defined exclusively by the appended claims.

What is claimed is:

1. A method for manufacturing a carrier of information or decoration, comprising the steps of:
    injection moulding said carrier in a mould unit,
    engaging a stamping means included in a stamping unit of the mould unit with an embossed sheet for applying a covering to said carrier,
    rotating the mould unit, retaining the carrier, to a coating station, and
    casting a coating of a transparent material over the carrier provided with the covering.

2. A method as claimed in claim 1, in which said carrier is injection moulded so as to have a base and a portion projecting from the base and carrying at its end facing away from the base a surface, said covering being applied to said surface.

3. A method as claimed in claim 2, wherein the step of applying said covering to the surface is carried out integrally with the step of injection moulding the carrier.

4. A method as claimed in claim 1, further comprising the step of casting a coating of a transparent material over the carrier provided with a covering.

5. A method as claimed in claim 1, wherein the step of applying said covering to the surface is carried out integrally with the step of injection moulding the carrier.

6. An assembly for manufacturing carriers of information or decoration, comprising:
    a mould unit comprising two mould means which are joinable with each other,
    the mould unit comprising
    an injection moulding station for injection moulding of said carriers,
    a printing station with a stamping unit for applying to said carrier a covering formed in accordance with the current information or decoration,
    the printing station being integrated into the injection moulding station, and
    a coating station for casting a coating of a transparent material over the covering applied to the carrier, a first of the mould means being rotatably arranged to allow displacement of a carrier provided with a covering at the printing station and retained in said first mould means, to the coating station.

7. An assembly as claimed in claim 6, wherein the stamping unit of the printing station comprises a stamping means which is engageable with an embossed sheet for applying said covering to each carrier.

8. An assembly as claimed in claim 7, wherein said embossed sheet is feedable for exposing a not previously used sheet portion for each carrier.

9. An assembly as claimed in claim 6, in which the injection moulding station is adapted to manufacture carriers having a base and at least one portion which projects from the base and whose end facing away from the base carries a surface of a geometric appearance corresponding to said information or decoration, the stamping unit being adapted to apply said covering to said surface.

10. An assembly as claimed in claim 9, in which the projecting portion of said carrier acts as a stamping means of the stamping unit.

11. An assembly as claimed in claim 6, in which the injection moulding station comprises
    a void formed in a first of the mould means and being open towards a second of the mould means, and
    an element arranged on the second mould means and having a through hole of the second mould means forming a bottom of the hole which is open towards the first mould means,
    said element being located, when putting together the mould means, so as to be arranged over the void defined by the void and the bottom,
    the void defining a base defining a projecting portion and the bottom defining said surface in connection with the filling of the cavity for injection moulding of each carrier.

12. An assembly as claimed in claim 11, wherein the element comprises a plurality of holes to allow manufacture of carriers having a corresponding number of projecting portions and associated surfaces.

13. An assembly as claimed in claim 12, in which the printing station comprises an embossed sheet, said surface of each carrier being engaged with the embossed sheet in connection with the injection moulding of the carrier.

14. An assembly as claimed in claim 11, in which the printing station comprises an embossed sheet of each carrier being engaged with the embossed sheet in connection with the injection moulding of the carrier.

15. An assembly as claimed in claim 14, in which the embossed sheet is arranged between the side of the second mould means facing the first mould means and the element.

16. An assembly as claimed in claim 14, wherein the coating station comprises a holding means arranged on the first mould means and adapted to retain a carrier with its projecting portion facing the second mould means and a void formed in the second mould means and open towards the first mould means, said mould means, when being put together, forming a cavity defined by the carrier and the void the transparent material is introducible for casting a coating over said projecting portion and the associated surface.

17. An assembly as claimed in claim 16, in which the holding means of the coating station consists of a void identical to the void of the injection moulding station, the void of the coating station being movable to the injection moulding station by rotation of the first mould means about an axis of rotation, and the coating station comprising means for ejecting a completed carrier retained in its void.

18. An assembly as claimed in claim 17, wherein the first mould means is intended for rotation through 180°, whereby the void of the injection moulding station is movable to the coating station during said rotation.

19. A method for manufacturing a carrier of information or decoration, comprising the steps of:
    injection moulding said carrier in a mould unit, and
    applying a covering to said carrier in the same mould unit by means of a stamping unit, the step of applying said covering to the surface being carried out integrally with the step of injection moulding the carrier.

rotating the mould unit, with said carrier retained therein, to a coating station, and casting a coating of a transparent material over the covering on the carrier.

20. A method as claimed in claim 19, in which said carrier is injection moulded so as to have a base and a portion projecting from the base and carrying at its end facing away from the base a surface, said covering being applied to said surface.

21. A method as claimed in claim 19, further comprising the step of casting a coating of a transparent material over the carrier provided with a covering.

22. An assembly for manufacturing carriers of information or decoration, comprising:

a mould unit comprising two mould means, which are joinable with each other, the mould unit comprising an injection moulding station for injection moulding of said carrier, and a printing station with a stamping unit for applying to said carrier a covering formed in accordance with the current information or decoration, the stamping unit of the printing station comprising a stamping means which is engageable with an embossed sheet for applying said covering to each carrier, and a coating station for casting a coating of a transparent material over the covering applied to the carrier, a first of the mould means being rotatably arranged to allow displacement of a carrier provided with a covering at the printing station and retained in said first mould means, to the coating station.

23. An assembly as claimed in claim 22, in which the printing station is arranged separately from the injection moulding station a first of the mould means being rotatably arranged to allow displacement of a carrier manufactured at the injection moulding station and retained in said first mould means, to the printing station.

24. An assembly as claimed in claim 22, wherein said embossed sheet is feedable for exposing a not previously used sheet portion to each carrier.

25. An assembly as claimed in claim 22, in which the injection moulding station is intended for manufacturing carriers having a base and at least one portion which projects from the base and whose end facing away from the base carries a surface of a geometric appearance corresponding to said information or decoration, the stamping unit being intended for application of said covering to said surface.

26. An assembly as claimed in claim 25, in which the projecting portion of each carrier acts as said stamping means of the stamping unit.

27. An assembly as claimed in claim 22, in which the injection moulding station comprises a void which is formed in a first of the mould means and which is open towards a second of the mould means, and an element arranged on the second mould means and having a through hole the second mould means forming a bottom of the hole which is open towards the first mould means, said element being located, when putting together the mould means so as to be arranged over the void in order to form a cavity defined by the void, the hole and the bottom, the void defining a base, the hole defining a projecting portion and the bottom defining said surface in connection with the filling of the cavity for injection moulding of each carrier.

28. An assembly as claimed in claim 27, wherein the element comprises a plurality of holes to allow manufacture of carriers with a corresponding number of projecting portions and associated surfaces.

29. An assembly as claimed in claim 28, in which the printing station is integrated into the injection moulding station, said surface of each carrier being engaged with the embossed sheet in connection with injection moulding of the carrier.

30. An assembly as claimed in claim 28 in which the printing station is arranged separately from the injection moulding station said surface of each carrier being engaged with said embossed sheet in connection with putting together of the mould means.

31. An assembly as claimed in claim 27, in which the printing station is integrated into the injection moulding station, said surface of each carrier being engaged with the embossed sheet in connection with injection moulding of the carrier.

32. An assembly as claimed in claim 31, in which the embossed sheet is arranged between the side of the second mould means facing the first mould means and the element.

33. An assembly as claimed in claim 27, in which the printing station is arranged separately from the injection moulding station said surface of each carrier being engaged with said embossed sheet in connection with puffing together of the mould means.

34. An assembly as claimed in claim 33, in which the printing station comprises a holding means arranged on the first mould means and adapted to retain a carrier with is projecting portion facing the second mould means, the surface of the carrier being engageable with said embossed sheet by putting together the mould means.

35. An assembly as claimed in claim 34, in which the holding means consists of a void identical to the void of the injection moulding station a carrier made at the injection moulding station and retained in its void being movable to the printing station by rotation of the first mould means about an axis of rotation.

36. An assembly as claimed in claim 31, wherein the coating station comprises a holding means arranged on the first mould means and adapted to retain a carrier with its projecting portion facing the second mould means and a void formed in the second mould means and open towards the first mould means, said mould means, when being put together, forming a cavity defined by the carrier and the void, in which cavity the transparent material is introducible for casting over said projecting portion and the associated surface.

37. An assembly as claimed in claim 36, in which the holding means of the coating station consists of a void identical to the void of the injection moulding station, the void of the coating station by rotation of the first mould means about an axis of rotation, being movable to the injection moulding station, and the coating station comprising means for ejecting a completed carrier retained in its void.

38. An assembly as claimed in claim 37, wherein the first mould means is intended for rotation through 180°, whereby the void of the injection moulding station during said rotation is movable to the coating station.

39. An assembly as claimed in claim 37, wherein the first mould means is intended for rotating through 120°, whereby a carrier located at the printing station and retained in the first mould means is movable to the coating station by said rotation.

* * * * *